(12) United States Patent
Assemat et al.

(10) Patent No.: US 10,533,842 B2
(45) Date of Patent: Jan. 14, 2020

(54) SYSTEM AND METHOD FOR CONTACTLESS MEASUREMENT OF CIRCULAR GEOMETRICAL PARAMETERS OF TURBINE ENGINE COMPONENTS

(71) Applicant: Safran Aero Boosters S.A., Herstal (BE)

(72) Inventors: Romain Assemat, Liège (BE); Jean-Michel Lorange, Cheratte (BE)

(73) Assignee: Safran Aero Boosters S.A., Herstal (BE)

( * ) Notice: Subject to any disclaimer, the term of this patent is extended or adjusted under 35 U.S.C. 154(b) by 169 days.

(21) Appl. No.: 15/786,512

(22) Filed: Oct. 17, 2017

(65) Prior Publication Data
US 2018/0106603 A1    Apr. 19, 2018

(30) Foreign Application Priority Data
Oct. 18, 2016 (BE) .................................. 2016/5776

(51) Int. Cl.
| | | |
|---|---|---|
| *G01M 15/14* | (2006.01) | |
| *G01B 11/24* | (2006.01) | |
| *G01B 11/02* | (2006.01) | |
| *G01B 11/08* | (2006.01) | |

(52) U.S. Cl.
CPC .............. *G01B 11/24* (2013.01); *G01B 11/02* (2013.01); *G01B 11/08* (2013.01)

(58) Field of Classification Search
CPC .................................................... G01M 15/14
USPC ......................................... 73/112.01, 118.03
See application file for complete search history.

(56) References Cited

U.S. PATENT DOCUMENTS

| | | | | |
|---|---|---|---|---|
| 4,630,927 A | * | 12/1986 | Fulkerson | G01S 17/32 356/624 |
| 4,798,469 A | | 1/1989 | Burke | |
| 4,942,294 A | * | 7/1990 | Witte | G01D 5/268 250/226 |
| 5,568,260 A | | 10/1996 | Schneiter | |
| 2010/0074727 A1 | * | 3/2010 | Twerdochlib | G01H 1/006 415/118 |
| 2010/0317975 A1 | * | 12/2010 | Yelin | A61B 5/0084 600/476 |
| 2013/0266420 A1 | * | 10/2013 | Kidane | G01B 11/02 415/118 |

(Continued)

OTHER PUBLICATIONS

Belgian Search Report dated Oct. 29, 2016, issued in corresponding Belgian Application No. 201605776, filed Oct. 18, 2016, 16 pages.

*Primary Examiner* — Eric S. McCall
(74) *Attorney, Agent, or Firm* — Christensen O'Connor Johnson Kindness PLLC

(57) ABSTRACT

A system for contactless measurement of circular geometrical parameters of a turbine engine component, comprising a contactless measurement module comprising a support, having a fixed position, for supporting the turbine engine component; an optical measurement device for transmitting a plurality of light beams onto at least the internal surface of the internal side wall, and for acquiring a plurality of reflections coming from the plurality of light beams, mechanically coupled to the support and comprising: an electronic conversion unit for converting a plurality of signals of the first optical sensor into a plurality of values of the plurality of circular geometrical parameters.

13 Claims, 7 Drawing Sheets

A- A

(56) References Cited

U.S. PATENT DOCUMENTS

| | | | |
|---|---|---|---|
| 2015/0015693 A1* | 1/2015 | Baleine | H04N 7/183 |
| | | | 348/82 |
| 2016/0245262 A1* | 8/2016 | Ide | F03D 17/00 |
| 2017/0268963 A1* | 9/2017 | Conner | G01B 11/00 |
| 2018/0164150 A1* | 6/2018 | Leroux | G01H 1/006 |
| 2018/0230971 A1* | 8/2018 | Ikawa | F03D 17/00 |

* cited by examiner

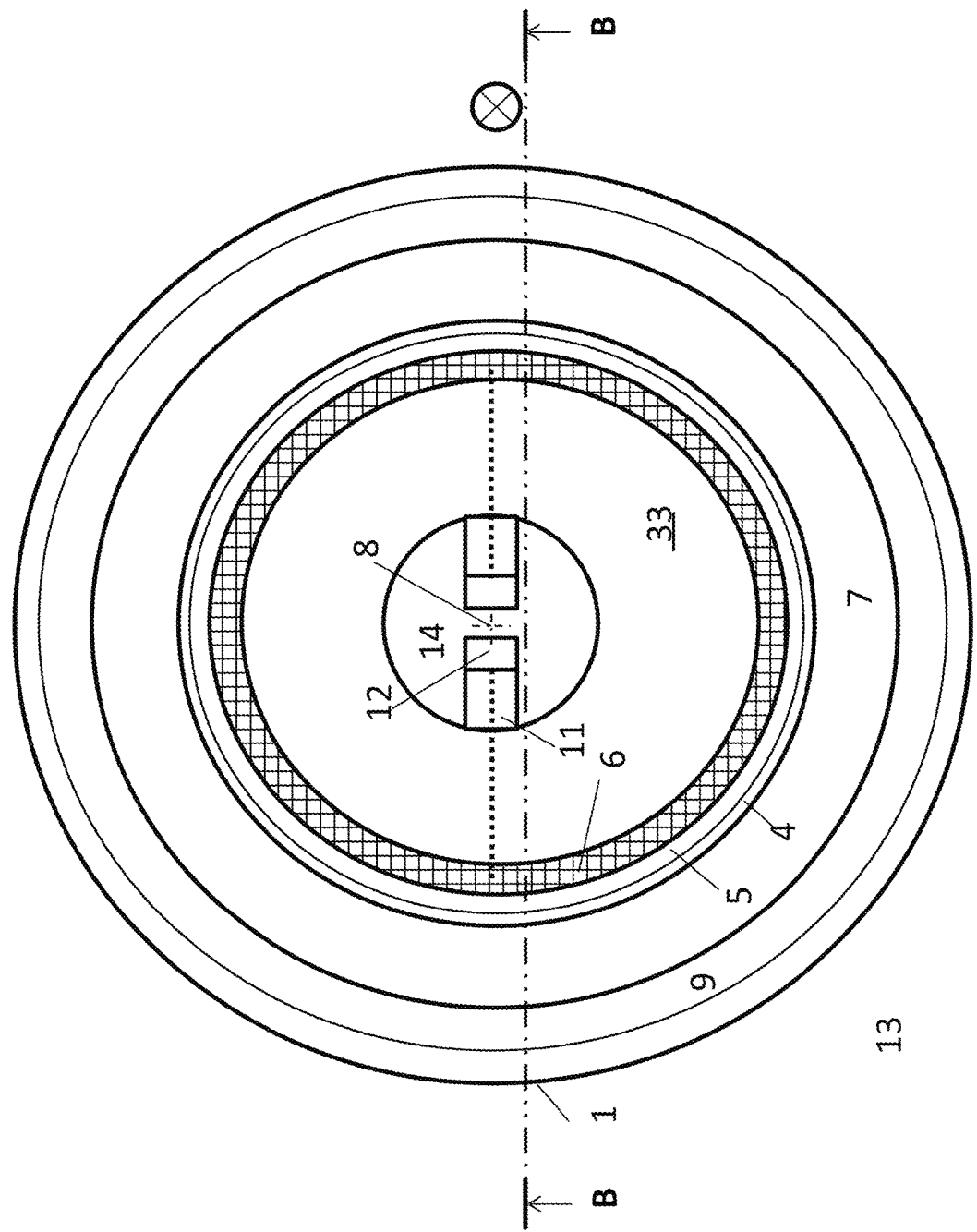

SYSTEM AND METHOD FOR CONTACTLESS MEASUREMENT OF CIRCULAR GEOMETRICAL PARAMETERS OF TURBINE ENGINE COMPONENTS

BACKGROUND

Technical Field

According to a first aspect, the invention relates to a system for contactless measurement of a plurality of circular geometrical internal parameters of turbine engine components.

According to a second aspect, the invention relates to a method for contactless determination of internal diameters of turbine engine components.

Prior Art

Turbine engines allow energy to be transferred between a solid rotatable portion and a fluid. Turbine engines incorporate circular rotatable components (rotor) and also require fixed components (stator) for the reception of said rotatable components. The fixed components of turbine engines may be characterised by their internal diameters. In gas turbine or turbojet engine applications, for example, monitoring one or more internal diameters of the fixed components is crucial in order to minimise the spacing between the rotatable component and the fixed component.

The internal diameters of turbine engine components may exceed a metre and require precision of approximately a micrometre to tenths of a micrometre. Turbine engine components, for example the internal collars of a turbojet engine, very often have internal diameters that vary depending on the depth of the component. In the case of the internal collars of turbine engines, said collars are made of metal and have, on the internal walls thereof, a track made of a plastics material. The internal diameters of turbine engine collars are often measured in the region of the track made of a plastics material.

Measuring the internal diameters of turbine engine components is necessary to ensure the dimensions are respected during manufacture and in quality control operations. The internal diameters of fixed components of turbine engines are generally measured using gauges equipped with probes. The probes are provided with points which are brought into contact with the component to be measured. A plurality of diameters of the same turbine engine component is usually measured at different heights of a turbine engine component. An assembly of a gauge equipped with probes is necessary for measuring each of the desired heights. Monitoring of a turbine engine component requires monitoring of the internal diameter over two to four heights and therefore requires two to four assemblies of gauges equipped with probes to be available. The gauges also require regular calibration which requires a calibration standard specific to each of the assemblies of gauges equipped with probes.

The drawbacks associated with measurement by gauges equipped with probes are that said measurement requires a large number of assemblies of gauges equipped with probes in order to be able to measure the internal diameters at a plurality of heights for different turbine engine components. This means that, in order to measure a plurality of diameters of the same component, the measurement is carried out by successively positioning each of the gauges equipped with probes corresponding to the diameter to be measured at different heights. Moreover, contact between the point of the probe and the track made of a plastics material having the internal diameter to be measured may produce uncertainty in the measurement due to the penetration of the probe into the track made of a plastics material. The resulting measurement uncertainty requires a large number of measurements to be taken in order to obtain an average of the measurements made. Carrying out a large number of measurements allows uncertainty over the measurement to be overcome in part but is very demanding in terms of time and handling of the measurement equipment.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to a first aspect, one of the objects of the invention is to provide a system for contactless measurement of circular geometrical parameters of turbine engine components which allows measurements to be taken more quickly and in a way that is less cumbersome to implement. Accordingly, the inventors propose a system for contactless measurement of a plurality of circular internal geometrical parameters of a turbine engine component having an axis of rotational symmetry, comprising:
  said turbine engine component comprising:
  an external side wall that is symmetrical about said axis of rotational symmetry and delimiting an open recess of said turbine engine component;
  an internal side wall that is symmetrical about said axis of rotational symmetry, situated in said open recess, connected to said external side wall by a radial component and comprises an internal surface delimiting an open internal recess of the turbine engine component;
  a contactless measurement module comprising:
  a support for supporting said turbine engine component;
  an optical measurement device for transmitting a plurality of light beams onto at least said internal surface of said internal side wall and for acquiring a plurality of reflections coming from said plurality of light beams, which device is mechanically coupled to said support and comprises:
  a first light source for transmitting said plurality of light beams;
  a first optical sensor for acquiring said plurality of reflections;
  mechanical support means for supporting said first light source and said first optical sensor, said mechanical support means being in contact with said support;
  said first light source and said first optical sensor being suitable for insertion in said open internal recess;
  an electronic conversion unit for converting a plurality of signals from said first optical sensor into a plurality of values of said plurality of circular internal geometrical parameters.

The contactless measurement system of the invention allows measurements of geometrical parameters of turbine engine components to be carried out by positioning the turbine engine component on the support and by activating the optical measurement device and the electronic conversion unit. The optical measurement device, coupled to the electronic conversion unit, allows one or more distances between a wall of the turbine engine component and the optical measurement device to be determined. For example, measurement by triangulation of the emitted light beam and of the reflected light beam allows one or more distances to be determined as described above.

The advantage of this contactless measurement system is that it can be used to measure circular geometrical parameters and internal diameters of turbine engine components that have very different shapes and dimensions. Said contactless measurement system also allows measurement of internal diameters at different heights of the same turbine engine component. Measuring internal diameters at a plurality of heights is particularly useful for parts that are conical in shape, such as some turbine engine components. Said contactless measurement system allows rapid positioning and rapid measurement as said system is contactless and therefore does not require a phase of taking measurements using probes, which is very costly in terms of time. Said contactless measurement system presents fewer risks of damaging a turbine engine component with the points with which the probes are equipped. Said system allows better reproducibility of a measurement as it helps overcome the measurement error caused by the penetration of the points of the probes into the silicon track of which the diameter is being measured.

Another advantage of said contactless measurement system is that the optical measurement device is positioned inside the turbine engine component, which allows direct measurement of geometrical parameters of internal components of the turbine engine component. Preferably, said measurement system is well suited to measuring turbine engine components that have an inner wall connected to an outer wall by a radial component. This is because this type of turbine engine component does not permit measurement of the internal wall by measuring the external wall; for example, measuring external dimensions, while knowing a wall thickness, makes it possible for an internal dimension to be deduced. However, this technique is not compatible with measuring turbine engine components that have an external wall and an internal wall connected to the external wall by a radial component.

An advantage of the measurement system according to the invention is that the bottom opening of, or an opening positioned at the bottom of, the turbine engine component may be positioned around the optical measurement device. This configuration of the measurement system can be more easily implemented in production methods and handling methods already used for this type of turbine engine components. The advantage of the optical measurement device being mechanically coupled to the support by means of the bottom opening of the turbine engine component rather than by means of the top opening allows for a more compact, less complex system that does not require complex movable components that produce measurement uncertainty.

Preferably, the mechanical support means of the optical measurement device rest on said support.

Preferably, the mechanical support means of the optical measurement device comprise a tower.

An advantage of the system of the invention is that it allows measurements to be taken of turbine engine components without having to move the turbine engine component when said component is in position on the support. The optical measurement device allows light beams to be transmitted onto different portions inside the turbine engine component. This allows, for example, for an optical measurement device that has means for rotatable or translational displacement of the optical measurement device that are more precise and less costly than displacement means intended to move the support supporting the turbine engine component. Moreover, the support need not be moved in order to measure at least one circular geometrical parameter. This preferably allows for a tower without any displacement means, the tower being fixed relative to the support. Another advantage of the tower according to the invention is that said tower allows the internal surface 5 of the internal wall 4 to be measured without the need to exchange or select an optical component which permits correct transmission and correct collection of a light beam for measuring a circular geometrical parameter. The system of the invention does not have interchangeable components.

Preferably, said axis of rotational symmetry passes through the optical measurement device.

Preferably, the optical measurement device and said support are coupled in a non-movable manner.

In a particular embodiment of the invention, the optical measurement device does not need to be centred relative to the turbine engine component.

Preferably, the support has a fixed position.

An additional advantage is that the support does not need to be rotatable and is preferably fixed. This allows for a simpler system and does not require a rotatable and/or translatable support which can receive a heavy and bulky turbine engine component.

Preferably, the optical measurement device also comprises a second light source or a second and a third light source for transmitting a plurality of additional light beams onto at least said internal surface of said internal side wall, and a second optical sensor or a second and a third optical sensor for acquiring a plurality of reflections coming from said plurality of additional light beams transmitted by said second light source or by said second and third light sources, supported by said mechanical support means, and being suitable for insertion in said open internal recess, and in that said electronic conversion unit is also configured to convert said plurality of signals from said second and third optical sensors into a plurality of values of said plurality of circular internal geometrical parameters.

Preferably, the second and third light sources and sensors allow circular internal geometrical parameters to be measured more quickly, with greater precision and without the need for example for a centring step. There is for example a plurality of light sources and of optical sensors which behave in the same way as the first and second light sources.

Preferably, said plurality of circular internal geometrical parameters make it possible to determine an internal diameter of said turbine engine component which has an axis of rotational symmetry.

Preferably, said turbine engine component is a stator stage of a turbine engine, in that said external side wall is an external collar, in that said internal side wall is an internal collar and in that said radial component is a vane.

Preferably, the internal surface is lined at least in part with a track made of a plastics material.

An optical measurement is particularly well suited to taking dimensions on materials having diffuse reflection rather than specular reflection. The track made of a plastics material, for example a silicon-type material, preferably has a matt black appearance which renders the use of optical measurement for taking the dimensions of the silicon track even more useful in order to obtain precise and repeatable results. Optical measurement for taking the dimensions of a plastics material (polymer) is even more advantageous than taking dimensions using probes as it allows measurement errors produced by the interaction of the probes with the track made of a plastics material to be overcome.

Preferably, the contactless measurement system also comprises a robotic arm and mechanical support means that are mechanically coupled to said support by said robotic arm.

According to a second aspect, one of the objects of the invention is to provide a method for measuring diameters of a turbine engine component which is faster and less cumbersome to implement. Accordingly, the inventors propose a method for determining an internal diameter of a turbine engine component which has an axis of rotational symmetry and comprises:

an external side wall which is symmetrical about said axis of rotational symmetry and delimits an open recess of said turbine engine component;

an internal side wall which is symmetrical about said axis of rotational symmetry, situated in said open recess, connected to said external side wall by a radial component and comprises an internal surface delimiting an open internal recess of the turbine engine component;

said method comprising the following steps:

providing a support for supporting said turbine engine component and an optical measurement device comprising:
  a first light source for transmitting at least one light beam;
  a first optical sensor for detecting at least one light signal coming from the first light source;
  mechanical support means supporting said first light source and said first optical sensor, and being in contact with said support;

positioning said turbine engine component on said support in such a way that said first light source is suitable for illuminating said internal surface at least in part;

determining a reference plane perpendicular to said axis of rotational symmetry;

determining a first distance relative to said reference plane corresponding to a location on said internal surface illuminated by said first light source;

activating said first light source to transmit a light beam onto said internal surface;

acquiring, via said first optical sensor, a light signal coming from the reflection of said light beam generated in the previous step;

converting the signal obtained in the previous step into a circular internal geometrical parameter value at said first distance relative to said reference plane determined in step e.

configuring the first light source to transmit a light beam to a location on the internal surface that is different from the location onto which the light beam generated at the iteration of the previous step e. was transmitted, and configuring the first optical sensor to acquire the reflection of said optical beam transmitted to said different location on the internal surface, in a plane perpendicular to said axis of rotational symmetry;

repeating steps e. to g.;

repeating steps h. and i. N times, where N is a whole number;

determining the internal diameter from a maximum value of said value of the circular internal geometrical parameter determined in step g. of each iteration;

said internal diameter being determined in a plane perpendicular to said axis of rotational symmetry.

The variants and advantages mentioned for the first aspect of the invention apply, mutatis mutandis, to the method according to the second aspect.

The advantage of said method is that it allows a circular geometrical parameter to be determined and, more particularly, a diameter of a turbine engine component that has a plurality of models and a plurality of sizes, using the same contactless measurement system. Said method also allows the measurement uncertainty due to the penetration of the points of the probe into the track made of a plastics material situated on the internal wall of the turbine engine component to be overcome. This is because the use of a contactless measurement system does not have the drawbacks associated with probes when measuring plastics materials. Said method allows a greater measurement range of circular internal geometrical parameters compared with measurement using probes. The measurement method using a contactless measurement system does not require a calibration bench that is specific to a particular circular internal geometrical parameter to be measured. Said method makes it possible to determine circular internal geometrical parameters, and more particularly an internal diameter of a cross section of a turbine engine component in a plane perpendicular to an axis of rotational symmetry of the turbine engine component.

Said method allows better repeatability compared with a measurement of circular internal geometrical parameters and more particularly an internal diameter taken with a gauge equipped with probes, as there is no contact in said method between the portion of the component to be measured and the optical measurement device.

Said method allows greater reproducibility of the same measurement of a turbine engine component as said method allows variations due to the intervention of an operator, such as the penetration of the probes into the silicon track due to the force applied by an operator, to be limited.

The advantage of said method is that it allows an internal diameter of a turbine engine component that has a plurality of models and a plurality of sizes to be measured using the same contactless measurement system. Said method allows a plurality of circular internal geometrical parameters to be measured and an internal diameter value to be determined. Said method helps ensure that the internal diameter value measured is indeed an internal diameter value and not a circular internal geometrical parameter such as a chord.

According to a second aspect, one of the objects of the invention is to provide a method for determining a plurality of diameters of a turbine engine component that has an axis of rotational symmetry and comprises:

an external side wall that is symmetrical about said axis of rotation and that delimits an open recess of said turbine engine component;

an internal side wall that is symmetrical about said axis of rotation, situated in said open recess, connected to said external side wall by a radial component and comprises an internal surface delimiting an open internal recess of the turbine engine component;

said plurality of diameters being determined in different planes perpendicular to said axis of rotational symmetry;

said method comprising the steps of the preceding claim and also comprising the following steps:

configuring the first light source to transmit a beam to a location on the internal surface that is different from the location on which the light beam generated at the iteration of the previous step e. was transmitted, and configuring the first optical sensor to acquire the reflection of said optical beam transmitted to said different location on the internal surface, in a plane parallel to said axis of rotational symmetry;

executing steps a. to k. of the preceding claim;

repeating steps l. to m. M times, where M is a whole number;

supplying values for said plurality of internal diameters of the turbine engine component in said different planes perpendicular to said axis of rotational symmetry and corresponding to the different locations along said axis of rotational symmetry imposed in step 1.

The advantage of the proposed method for determining a plurality of internal diameters allows a plurality of internal diameters to be measured, including over the entire height of a turbine engine component. Said method helps avoid handling a plurality of measurement tools for the characterisation or testing of the same turbine engine component that requires the measurement of internal diameters at a plurality of heights of a turbine engine component. Said method makes it possible to rapidly establish a profile of the internal diameter over the entire height of the internal diameter to be determined.

Preferably, the turbine engine component is a stator stage of a turbine engine, in that said external side wall in an external collar, in that said internal side wall is an internal collar, and in that said radial component is a vane.

Preferably, said support has a fixed position.

Preferably, said method for determining a plurality of internal diameters of a turbine engine component is characterised in that:

the first light source is suitable for being activated and for illuminating said internal surface at different locations for the same position of the optical measurement device;

the first optical sensor is suitable for acquiring said light signals coming from the reflections of said light signals generated by the first light source, and in that;

step g. consists in converting said signals of step f. into a plurality of values of said internal diameter.

The advantage of this preferred embodiment is that the associated method makes it possible to measure a plurality of circular internal geometrical parameters of a turbine engine component using the same position of the optical measurement device. Said method allows greater speed of measurement, as a plurality of circular internal geometrical parameters can be measured without moving the optical measurement device. Said method may also allow at least one internal diameter to be measured without moving the optical measurement device. The plurality of measured values of said circular internal geometrical parameter for the same position of the optical measurement device allows an internal diameter value to be determined.

Preferably, step c. of the method comprises the following steps:

illuminating said external side wall using said first light source;

acquiring, by means of said first sensor, a calibration light signal coming from a reflection, on the external side wall, of the light beam generated in the previous step;

associating a position of said reference plane with an end of the calibration light signal of the previous step.

The advantage of said method is that it allows a reference plane to be determined using the contactless measurement device. Detection by the first optical sensor for example of the end of the external side wall or for example of the end of the internal side wall allows a position of the reference plane to be defined on the end of the internal side wall or of the external side wall. Another advantage of said method is that it allows a circular internal geometrical parameter and a diameter to be measured in a single measurement without having to determine the reference plane beforehand. Said method also allows a circular internal geometrical parameter and/or an internal diameter to be determined very rapidly compared with a method that uses a gauge equipped with probes.

Preferably, the internal surface is substantially lined with a track made of a plastics material.

The use of an optical measurement is particularly well suited to taking dimensions on materials that have diffuse reflection rather than specular reflection. The track made of a plastics material, for example a silicon-type plastics material, preferably has a matt black appearance which renders the use of optical measurement of the dimensions of the silicon track even more useful in order to obtain precise and repeatable results.

Preferably, step h. consists in moving or translating said first light source and said first optical sensor along a line.

In another embodiment, step h. consists in moving or translating said first light source and said first optical sensor along at least a portion of a circle.

Preferably, the optical measurement device comprises other additional light sources and other additional optical sensors.

Preferably, step g. uses a triangulation method.

Preferably, step g. uses a time-of-flight method.

The use of an optical measurement device allows faster measurement of a plurality of internal diameters at a plurality of positions for the same height.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2a shows an embodiment of the method and of the device according to the invention;

Figure 1A:
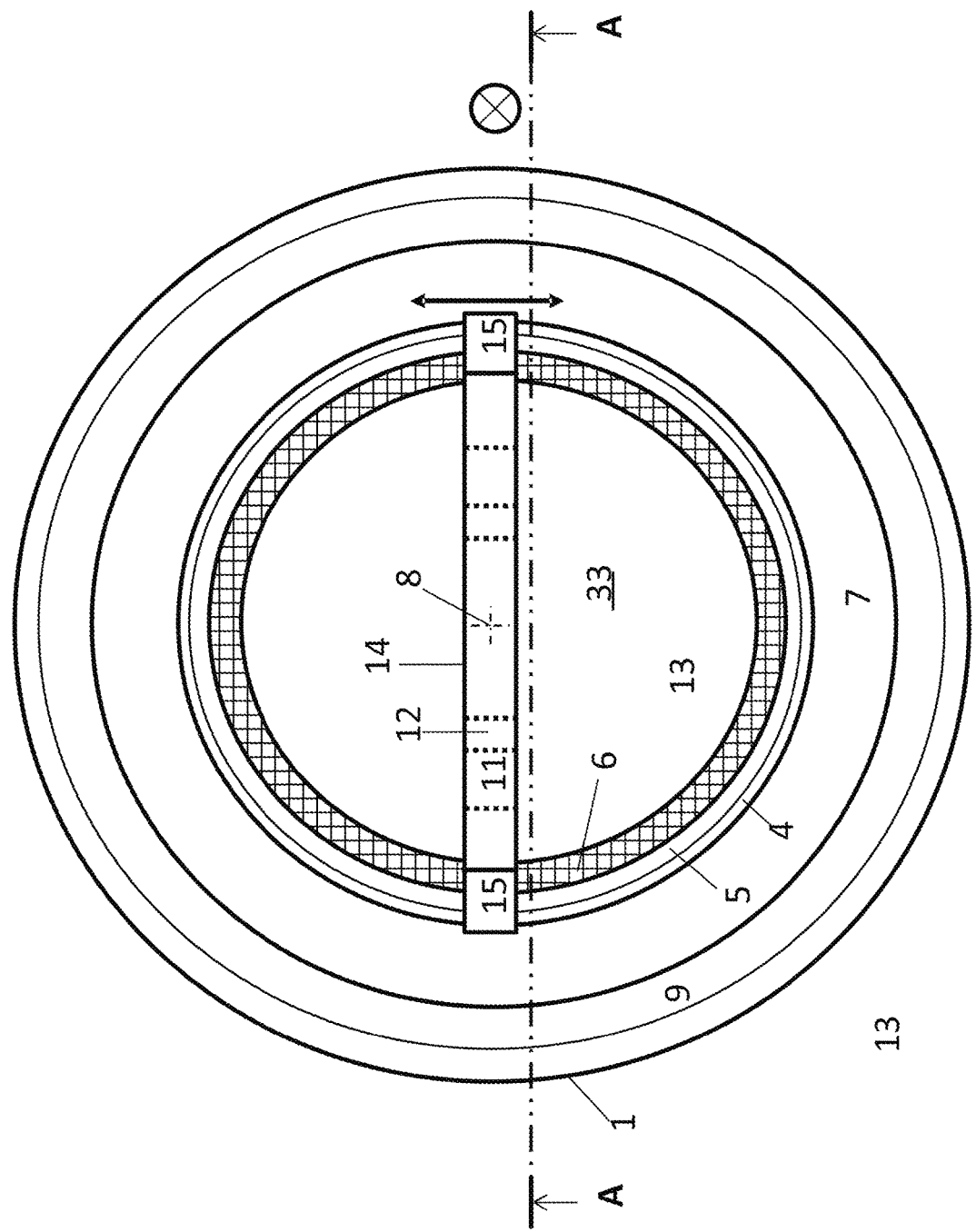
FIG. 1a shows an embodiment of the method and of the device.
Figure 1B:
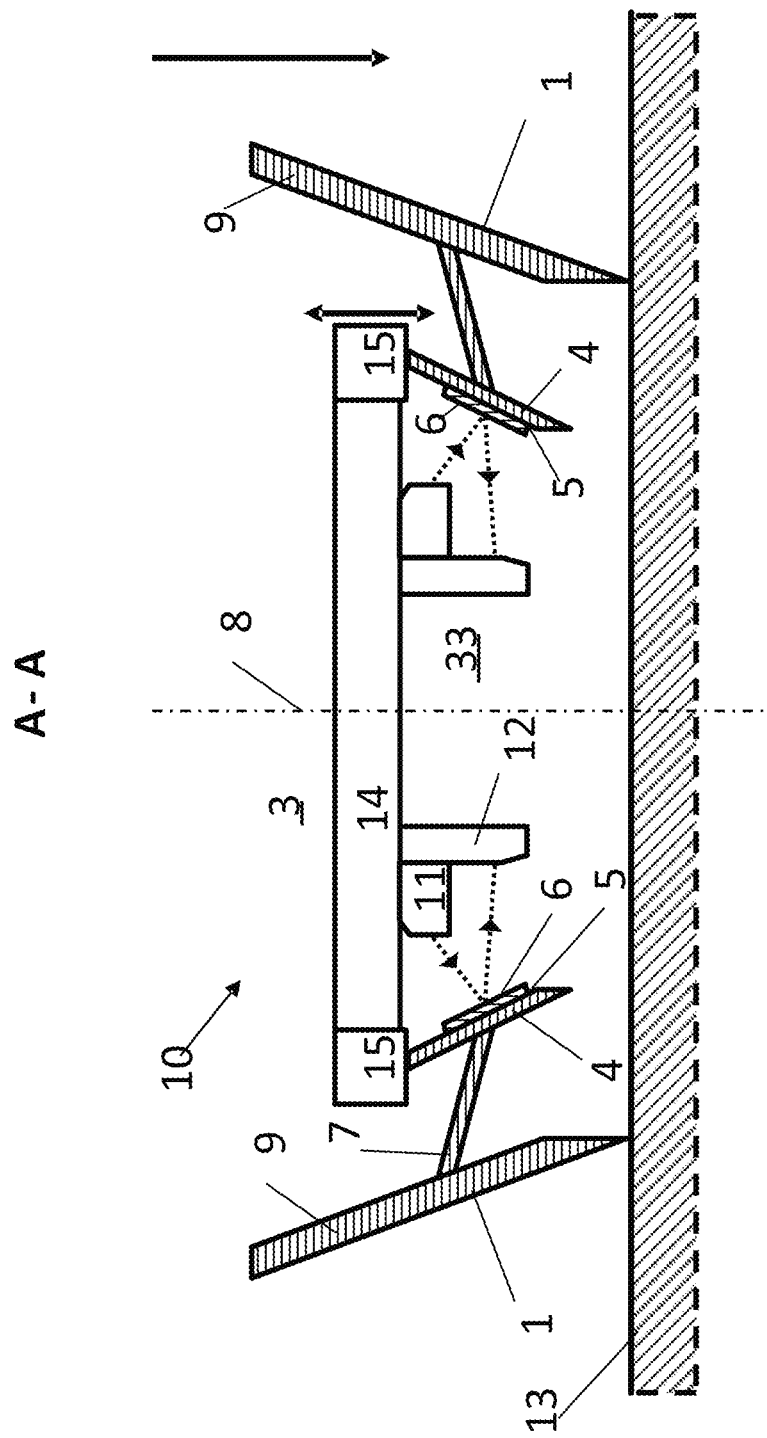
FIG. 1b is a view in cross section (A-A) of the turbine engine component and the positioning of the optical measurement system corresponding to the embodiment of the method and of the device shown in the previous figure.

The drawings are not to scale. Generally, the same components are denoted by the same reference signs in the figures. The presence of reference signs in the drawings should not be considered limiting, including if said numerals are signs in the claims.

DETAILED DESCRIPTION

While illustrative embodiments have been illustrated and described, it will be appreciated that various changes can be made therein without departing from the spirit and scope of the invention.

FIG. 1a shows an embodiment of the method and of the device according to the invention. The method allowing measurement of a circular geometrical parameter of a turbine engine component 1 comprises the step of providing a support 13 allowing a turbine engine component 1 to be positioned and supported. The support 13 preferably has a planar surface which may be used for example as a reference surface. The support 13 is for example a surface plate. According to the method, a turbine engine component 1 to be measured is provided and is positioned on the support 13. The turbine engine component 1 may be positioned on the support 13 at any free position provided the turbine engine component 1 is sufficiently supported by the support 13 for a circular geometrical parameter, and for example an internal diameter, to be measured. For example, the turbine engine component 1 is positioned on the support 13 at a predefined position and at the centre of the support 13. Preferably, the turbine engine component 1 is positioned in accordance with visual markers present on the support 13. Still more preferably, the turbine engine component 1 is positioned in accordance with limit stops present on the support 13. The turbine engine component 1 is preferably positioned with the narrowest portion thereof in contact with the support 13.

The turbine engine component 1 is provided with circular cross sections and an axis of rotational symmetry 8. The turbine engine component 1 comprises, about the axis of rotational symmetry 8 thereof, an external side wall 9 also known as an external collar, and an internal side wall 4 also known as an internal collar. The internal 4 and external 9 side walls are interconnected by a radial component 7. The radial component 7 is preferably a vane and is for example provided with recessed portions allowing the passage of air between the internal 4 and external 9 side walls. The internal 4 and external 9 side walls laterally delimit an open internal recess 33 and an open recess 3, respectively. In this particular embodiment, the optical measurement device 10 is positioned on the internal side wall 4, also known as an internal collar, of the turbine engine component 1 to be measured. The internal side wall 4 has an internal surface 5 which laterally delimits the open internal recess 33. The planes delimiting the ends of the internal 4 and external 9 side walls are preferably perpendicular to the axis of rotational symmetry 8 and parallel to one another. On the internal surface 5 thereof, the turbine engine component 1 has a silicon track 6. The silicon track 6 is a lining made of a plastics material deposited on the internal surface 5. Said lining is preferably made of a polymer and more preferably made of a silicon-type polymer. The silicon track 6 covers the internal side surface 5 preferably in part. For example, the silicon track 6 covers the internal side surface 5 in its entirety. The turbine engine component 1 is made of metal with the exception of the silicon track 6.

The mechanical support means 14 allow the first light source 11 and the first optical sensor 12 to be mechanically coupled. The mechanical support means 14 are for example a gauge made of carbon. The mechanical support means 14 preferably have mechanical coupling means 15 which allow the mechanical support means 14 to be positioned in a controlled way relative to the turbine engine component 1 to be measured. The mechanical support means 14 are preferably positioned, using the mechanical coupling means 15, at the ends of the internal side wall 4 of the turbine engine component 1 to be measured. The mechanical support means 14 are for example positioned directly on the internal side wall 4. The mechanical support means 14 are positioned in such a way that the light source 11 and the optical sensor 12 are positioned in the open recess 3 of the turbine engine component 1 and preferably in the open internal recess 33 which is itself delimited by the internal side wall 4.

According to the method for determining a circular geometrical parameter of a turbine engine component 1, in addition to a support 13 being provided and the turbine engine component 1 being positioned on the support 13, a reference plane perpendicular to the axis of rotational symmetry 8 is determined. The reference plane is for example the surface of the support 13. The reference plane 8 is preferably determined from the turbine engine component 1. The reference plane is for example defined by an end of the internal 4 or external 9 side wall. Preferably, the intersection of a reference plane which is perpendicular to the axis of rotational symmetry and the internal 4 or external 9 side wall forms a circle.

According to the method for determining a circular geometrical parameter of a turbine engine component 1, an optical measurement device 10 is provided. The optical measurement device 10 consists of a first light source 11 which allows a portion of the internal surface 5 to be illuminated. The light source 11 is for example a laser. The light source 11 preferably allows the internal surface 5 to be illuminated at one point. The light signal which illuminates a portion of the internal surface 5 is detected by a first optical sensor 12. The first optical sensor 12 and the first light source 11 are mechanically coupled to the mechanical support means 14. The first optical sensor 12 allows the light signal which is reflected on the internal surface 5 to be detected. Detection of the light signal by the first optical sensor 12 allows a first distance of the internal surface 5 relative to said reference plane to be detected. Preferably, the first optical sensor 12 allows a position of the light signal on the internal surface 5 to be detected. For example, the position of the light signal on the internal surface 5 allows a distance to be determined by a triangulation method. For example, the first optical sensor 12 and the first light source 11 allow a distance between the internal surface 5 and the optical sensor to be detected by a time-of-flight method. The method requires the activation of the first light source 11 and the first optical sensor 12 in a coordinated manner in order to be able to acquire the light signal emitted by the first light source 11. The signal acquired by the first optical sensor 12 is converted into a value of the circular geometrical parameter. Said conversion may be carried out using an electronic conversion unit 16. The circular geometrical parameter which is determined by said method is preferably a diameter. The circular geometrical parameter is for example a radius, a chord, a perimeter or a surface area.

According to a method for determining a diameter of a turbine engine component 1, the diameter of a cross section of the turbine engine component 1 is determined. The diameter determined is for example the diameter of a cross section in a plane perpendicular to the axis of rotational symmetry of the internal side wall 4. According to said method, circular geometrical parameters are measured successively in the same plane perpendicular to the axis of rotational symmetry 8. A plurality of measurements of circular geometrical parameters is carried out in the same plane by changing the position of the first light source 11 and of the first optical sensor 12 in a direction perpendicular to the axis of rotational symmetry 8. A circular geometrical parameter is measured for each of the positions of the first light source 11 and first optical sensor 12. The position of the first light source 11 and first optical sensor 12 is for example changed along a line. The position of the first light source 11 and first optical sensor 12 is for example changed by linear translation means. The circular geometrical parameters are determined and then recorded for each of the positions of the first light source 11 and first optical sensor 12. A diameter of a turbine engine component 1 is determined from the maximum value of the circular geometrical parameter determined and recorded. Preferably, the linear translation of the first light source 11 and first optical sensor 12 is carried out from a first position in the open internal recess 33 to a second position in the open internal recess 33.

According to a method for determining a plurality of diameters of a turbine engine component 1, a plurality of diameters corresponding to cross sections in planes preferably perpendicular to the axis of rotational symmetry of the internal side wall 4 is determined. Translation means allow the first light source 11 and first optical sensor 12 to be moved parallel to the axis of rotational symmetry. Said translation allows a plurality of diameters to be determined over the entire height of the internal side wall 4. Said translation also allows for example the determination of a plurality of diameters over the entire height of the external side wall 9. Determination of a plurality of diameters in planes perpendicular to the axis of rotational symmetry 8 and over the entire height of the internal side wall 4 allows for example a profile to be established of the diameters of the internal side wall 4. A profile of the diameters is even more useful if the internal side wall 4 is tapered. Said method preferably allows two internal diameters of the internal side wall 4 to be determined, and still more preferably said method allows four internal diameters to be determined in non-coincident planes perpendicular to the axis of rotational symmetry. Preferably, the diameters are determined at regular intervals along the axis of rotational symmetry.

According to the method for determining a plurality of circular geometrical parameters of a turbine engine component, a first light source 11 is used which is suitable for illuminating the internal side wall 4 on the internal surface thereof 5 at different locations for the same position of the first light source 11. The first optical sensor 12 allows detection of the light signal reflected preferably on the internal surface 5 for the same position. The first light source 11 is preferably a laser line which allows a line to be transmitted onto the internal surface 5. The first light source 11 may for example transmit points along a line in order to be able to determine a circular geometrical parameter for each of the light signals of each point. The method makes it possible to determine a plurality of circular geometrical parameter values in a plane perpendicular to the axis of rotational symmetry 8. The method also makes it possible to determine a plurality of circular geometrical parameter values in a plane parallel to the axis of rotational symmetry 8. The first optical sensor 12 is preferably a detector which allows detection, in one acquisition, of a line-type light signal or of a light signal composed of a plurality of points. The first optical sensor 12 is for example a charge-coupled device (CCD) detector.

The first optical sensor 12 and the first light source 11 which allow a plurality of circular geometrical parameters to be determined in the same position may also be used to determine a reference plane. The reference plane determined is preferably one of the ends of the internal side wall 4. The reference plane is determined by transmitting a line or a large number of points, preferably in a plane parallel to the axis of rotational symmetry 8 and by detecting the signal, reflected on the internal side wall 4, by means of the first optical sensor 12. A point of a reference plane is determined at the location where the light beam is no longer reflected or is reflected at a different angle of reflection because said beam illuminates beyond the internal side wall 4. Determination of a plurality of points corresponding to the same end of the internal side wall 4 allows a reference plane to be determined that corresponds to an end of the internal side wall 4. An end of the light signal corresponding to a portion of a component used as a reference plane may be determined by transmitting a calibration light signal generated by the first light source 11.

The optical measurement device 10 may comprise other additional light sources and other additional optical sensors. Preferably, the device 10 comprises a second light source and a second optical sensor. The second light source and optical sensor are preferably identical to the first light source 11 and to the first optical sensor 12. The first 11 and second light sources, just like the first 12 and second optical sensors, may be positioned so as to illuminate, at a fixed angle, the portion of the turbine engine component 1 to be measured. The fixed angle is for example 90°, 120° or 180°. The first 11 and second light sources are activated simultaneously, and the first 12 and second optical sensors allow the acquisition of the light beams coming from the first 11 and second light sources.

Figure 2B:
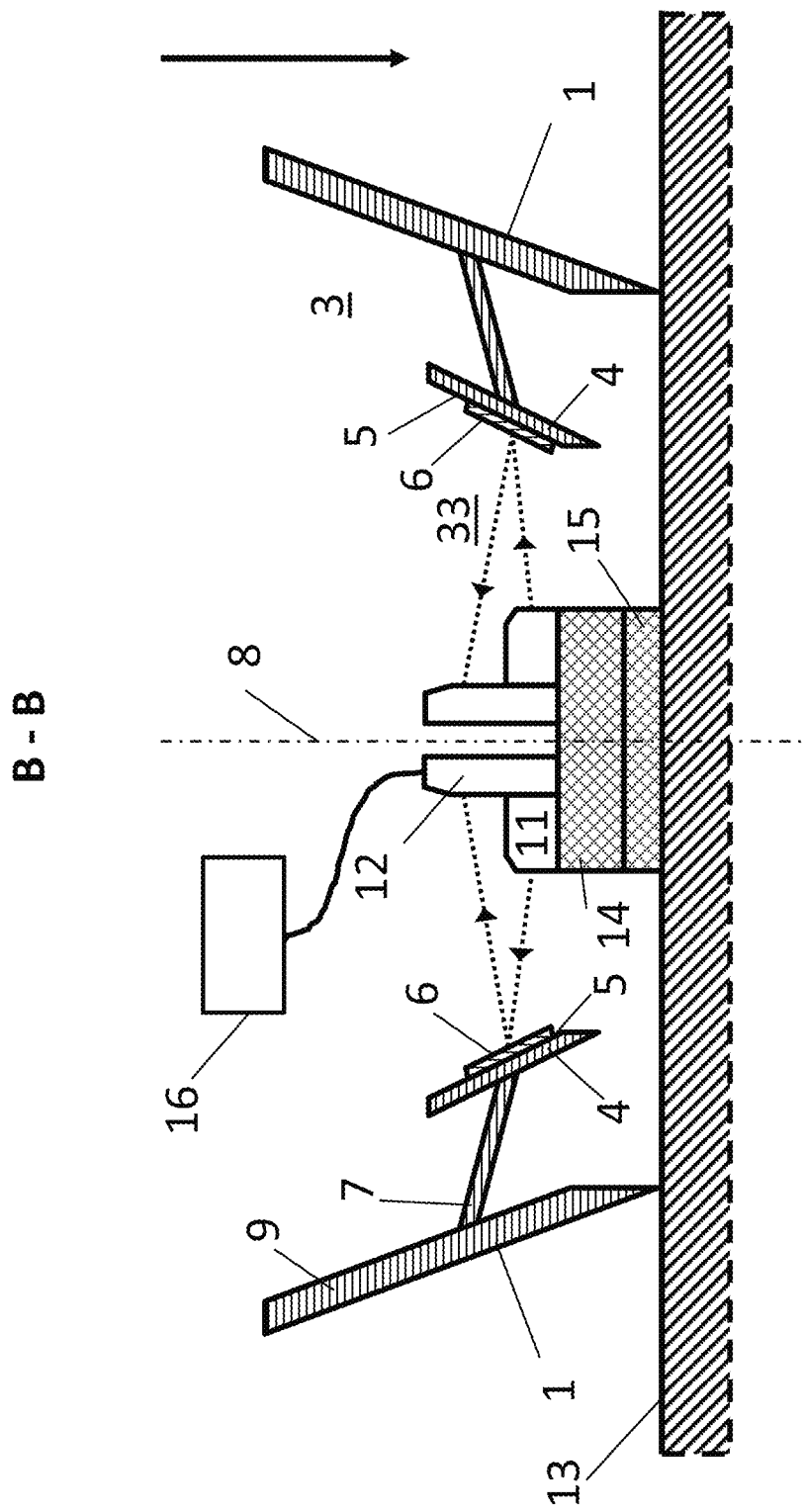
FIG. 2b is a view in cross section corresponding to the embodiment of the method shown in the previous figure according to the invention.
Figure 2C:
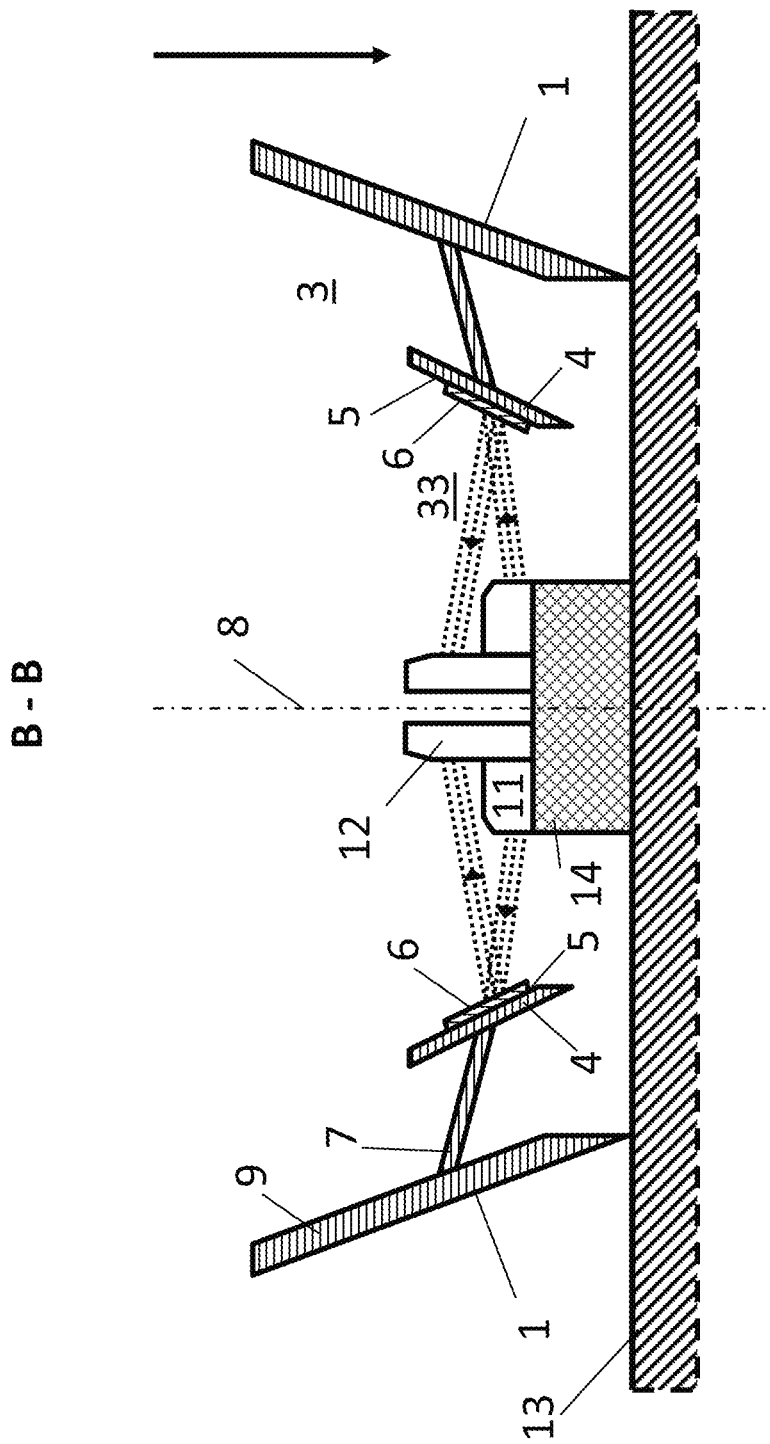
FIG. 2c is a view in cross section corresponding to the embodiment of the method and of the device shown in the previous figure according to the invention.

FIG. 2c shows a tower resting on the support 13, the tower comprising at least one light source 11 and at least one optical sensor 12. In this embodiment, the light source(s) is/are configured to illuminate the internal surface 5 of the internal wall 4 by means of a plurality of light beams and/or a plurality of additional light beams.

Figure 3:
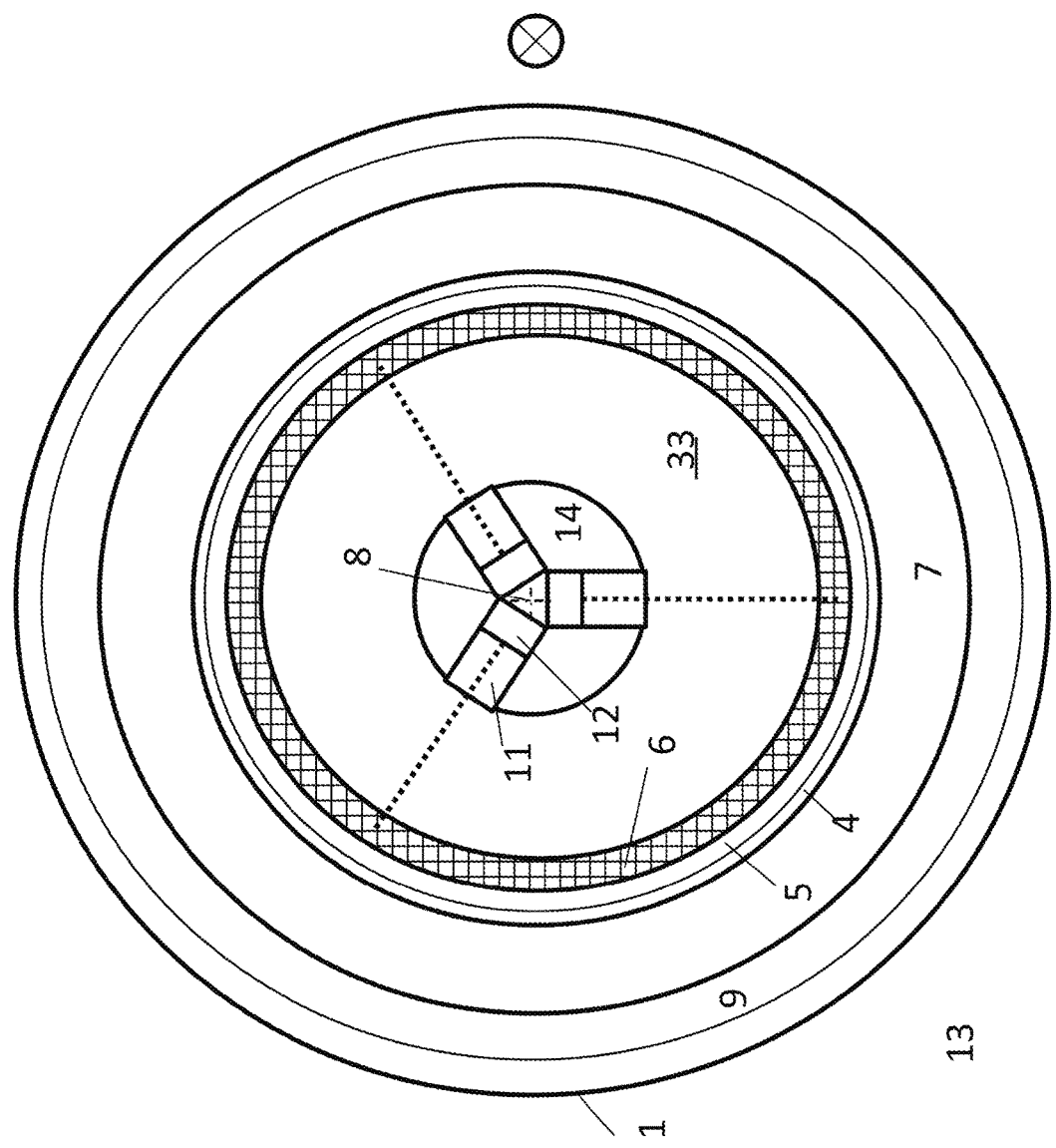
FIG. 3 shows an embodiment of the method and of the device.

FIG. 3 shows the method for measuring an internal diameter of a turbine engine component 1 in a real-life situation. The optical measurement system 10 also comprises a second and a third light source and a second and a third optical sensor, positioned at different angular positions on the mechanical support means 14. The three sets made up of a first 11, second and third light source and a first, second and third optical sensor are positioned at angular intervals of 120° for example. The turbine engine component 1 is positioned around the optical measurement system 10. The internal diameter of a cross section parallel to the reference plane is measured by positioning the optical measurement system 10 at the desired height.

Figure 4A:
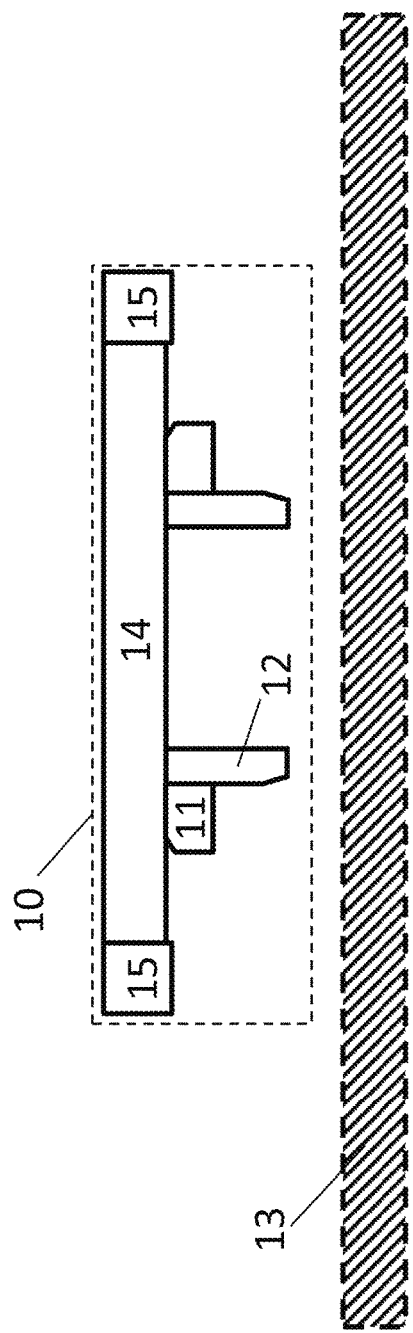
FIG. 4a shows an embodiment of the optical measurement system.

FIG. 4a shows a contactless measurement module comprising an optical measurement device 10 and a support 13. The contactless measurement device 10 comprises mechanical support means 14 which allow the mechanical coupling of the first light source 11 and first optical sensor 12 as well as other additional light sources and other optical sensors. The mechanical support means 14 are provided with mechanical coupling means 15 which allow correct positioning of the optical measurement device 10 relative to the turbine engine component 1 to be measured. The first light source 11 and the first optical sensor 12 may be positioned along the mechanical support means 14.

Figure 4B:
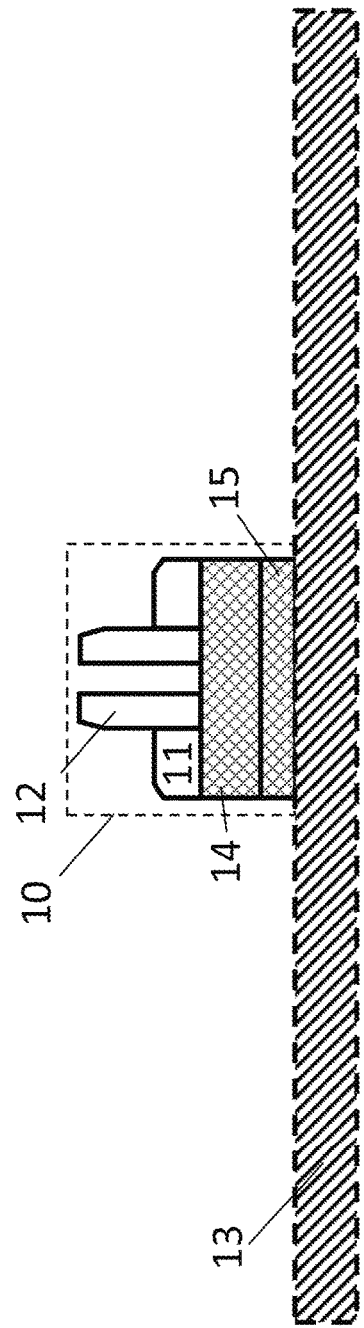
FIG. 4b shows an embodiment of the optical measurement system.

FIG. 4b shows the contactless measurement module of the invention comprising an optical measurement device 10 and a support 13. The optical measurement device 10 is a tower comprising mechanical support means 14 which allow the mechanical coupling of the first light source 11 and first optical sensor 12 as well as other additional light sources and other optical sensors. The mechanical support means 14 for example are provided with mechanical coupling means 15 which allow correct positioning of the contactless measurement device 10 relative to the turbine engine component 1 to be measured. The first light source 11 and the first optical sensor 12 are positioned on the mechanical support means 14. Where the optical measurement device 10 is a tower, the mechanical support means 14 are for example cylindrical and are preferably positioned so as to be centred on the axis of rotational symmetry 8 of the turbine engine component 1 to be measured.

The present invention has been described in relation to specific embodiments, which have a purely illustrative value and should not be considered as limiting. In a general manner, the present invention is not limited to the examples shown and/or described above. The use of the verbs 'comprise', 'include', 'have', or any other variant, and the conjugations thereof, may in no way exclude the presence of elements other than those mentioned. The use of the indefinite article 'a', 'an', or the definite article 'the', to introduce an element does not exclude the presence of a plurality of said elements. The reference signs in the claims do not limit the scope thereof.

In summary, the invention may also be described as follows. System for contactless measurement of circular geometrical parameters of a turbine engine component 1, comprising a contactless measurement module comprising:

a support 13, having a fixed position, for supporting said turbine engine component 1;

an optical measurement device 10 for transmitting a plurality of light beams onto at least said internal surface 5 of said internal side wall 4, and for acquiring a plurality of reflections coming from said plurality of light beams, which device mechanically coupled to said support 13, and comprises:

an electronic conversion unit 16 for converting a plurality of signals of said first optical sensor 12 into a plurality of values of said plurality of circular geometrical parameters.

The invention claimed is:

1. A system for contactless measurement of a plurality of circular internal geometrical parameters of a turbine engine component having an axis of rotational symmetry, wherein said turbine engine component comprises: an external side wall that is symmetrical about said axis of rotational symmetry and that delimits an open recess of said turbine engine component; and an internal side wall that is symmetrical about said axis of rotational symmetry, situated in said open recess, connected to said external side wall by a radial component and comprises an internal surface delimiting an open internal recess of the turbine engine component;

said system comprising:

(a.) a contactless measurement module comprising:
  (1.) a support for supporting said turbine engine component;
  (2.) an optical measurement device for transmitting a plurality of light beams onto at least said internal surface of said internal side wall and for acquiring a plurality of reflections coming from said plurality of light beams, wherein the optical measurement device is mechanically coupled to said support, and the optical measurement device comprises:
    (A.) a first light source for transmitting said plurality of light beams;
    (B.) a first optical sensor for acquiring said plurality of reflections;
    (C.) mechanical support means for supporting said first light source and said first optical sensor, said mechanical support means being in contact with said support; wherein said first light source and said first optical sensor being suitable for insertion in said open internal recess, wherein the optical measurement device also comprises a second light source or a second and a third light source for transmitting a plurality of additional light beams onto at least said internal surface of said internal side wall, and a second optical sensor or a second and a third optical sensor for acquiring a plurality of reflections coming from said plurality of additional light beams transmitted by said second light source or by said second and third light sources, supported by said mechanical support means and being suitable for insertion in said open internal recess;

(b.) an electronic conversion unit to convert a plurality of signals from said first optical sensor into a plurality of values of said plurality of circular internal geometrical parameters, and in that said electronic conversion unit is also configured to convert said plurality of signals from said second and third optical sensors into a plurality of values of said plurality of circular internal geometrical parameters.

2. A system for contactless measurement of a plurality of circular internal geometrical parameters of a turbine engine component having an axis of rotational symmetry, wherein said turbine engine component comprises: an external side wall that is symmetrical about said axis of rotational symmetry and that delimits an open recess of said turbine engine component; and an internal side wall that is symmetrical about said axis of rotational symmetry, situated in said open recess, connected to said external side wall by a radial component and comprises an internal surface delimiting an open internal recess of the turbine engine component;

said system comprising:

(a.) a contactless measurement module comprising:
  (1.) a support for supporting said turbine engine component;
  (2.) an optical measurement device for transmitting a plurality of light beams onto at least said internal surface of said internal side wall and for acquiring a plurality of reflections coming from said plurality of light beams, the optical measurement device is mechanically coupled to said support, and the optical measurement device comprises:
    (A.) a first light source for transmitting said plurality of light beams;
    (B.) a first optical sensor for acquiring said plurality of reflections;
    (C.) mechanical support means for supporting said first light source and said first optical sensor, said mechanical support means being in contact with said support; wherein said first light source and said first optical sensor being suitable for insertion in said open internal recess;

(b.) an electronic conversion unit to convert a plurality of signals from said first optical sensor into a plurality of values of said plurality of circular internal geometrical parameters, wherein said plurality of circular internal geometrical parameters allows an internal diameter of said turbine engine component having an axis of rotational symmetry to be determined.

3. A system for contactless measurement of a plurality of circular internal geometrical parameters of a turbine engine component having an axis of rotational symmetry, wherein said turbine engine component comprises: an external side wall that is symmetrical about said axis of rotational symmetry and that delimits an open recess of said turbine engine component; and an internal side wall that is symmetrical about said axis of rotational symmetry, situated in said open recess, connected to said external side wall by a radial component and comprises an internal surface delimiting an open internal recess of the turbine engine component, wherein said turbine engine component is a stator stage of a turbine engine, in that said external side wall is an external collar, in that said internal side wall is an internal collar, and in that said radial component is a vane;

said system comprising:
(a.) a contactless measurement module comprising:
  (1.) a support for supporting said turbine engine component;
  (2.) an optical measurement device for transmitting a plurality of light beams onto at least said internal surface of said internal side wall and for acquiring a plurality of reflections coming from said plurality of light beams, the optical measurement device is mechanically coupled to said support, and the optical measurement device comprises:
    (A.) a first light source for transmitting said plurality of light beams;
    (B.) a first optical sensor for acquiring said plurality of reflections;
    (C.) mechanical support means for supporting said first light source and said first optical sensor, said mechanical support means being in contact with said support; wherein said first light source and said first optical sensor being suitable for insertion in said open internal recess;
(b.) an electronic conversion unit to convert a plurality of signals from said first optical sensor into a plurality of values of said plurality of circular internal geometrical parameters.

4. A system for contactless measurement of a plurality of circular internal geometrical parameters of a turbine engine component having an axis of rotational symmetry, wherein said turbine engine component comprises: an external side wall that is symmetrical about said axis of rotational symmetry and that delimits an open recess of said turbine engine component; and an internal side wall that is symmetrical about said axis of rotational symmetry, situated in said open recess, connected to said external side wall by a radial component and comprises an internal surface delimiting an open internal recess of the turbine engine component, wherein the internal surface is lined at least in part with a track made of a plastics material;
said system comprising:
(a.) a contactless measurement module comprising:
  (1.) a support for supporting said turbine engine component;
  (2.) an optical measurement device for transmitting a plurality of light beams onto at least said internal surface of said internal side wall and for acquiring a plurality of reflections coming from said plurality of light beams, the optical measurement device is mechanically coupled to said support, and the optical measurement device comprises:
    (A.) a first light source for transmitting said plurality of light beams;
    (B.) a first optical sensor for acquiring said plurality of reflections;
    (C.) mechanical support means for supporting said first light source and said first optical sensor, said mechanical support means being in contact with said support; wherein said first light source and said first optical sensor being suitable for insertion in said open internal recess;
(b.) an electronic conversion unit to convert a plurality of signals from said first optical sensor into a plurality of values of said plurality of circular internal geometrical parameters.

5. A method for determining an internal diameter of a turbine engine component which has an axis of rotational symmetry and comprises:
an external side wall which is symmetrical about said axis of rotational symmetry and delimits an open recess of said turbine engine component;
an internal side wall which is symmetrical about said axis of rotational symmetry, situated in said open recess, connected to said external side wall by a radial component and comprises an internal surface delimiting an open internal recess of the turbine engine component;
said method comprising the following steps:
(a.) providing a support for supporting said turbine engine component and an optical measurement device comprising:
a first light source for transmitting at least one light beam;
a first optical sensor for detecting at least one light signal coming from the first light source;
mechanical support means supporting said first light source and said first optical sensor, and being in contact with said support;
(b.) positioning said turbine engine component on said support in such a way that said first light source is suitable for illuminating said internal surface at least in part;
(c.) determining a reference plane perpendicular to said axis of rotational symmetry;
(d.) determining a first distance relative to said reference plan corresponding to a location on said internal surface illuminated by said first light source;
(e.) activating said first light source to transmit a light beam onto said internal surface;
(f.) acquiring, by means of said first optical sensor, a light signal coming from the reflection of said light beam generated in the previous step;
(g.) converting the signal obtained in the previous step into a circular internal geometrical parameter value at said first distance relative to said reference plane determined in step c.;
(h.) configuring the first light source to transmit a beam to a location on the internal surface that is different from the location onto which the light beam generated at the iteration of the previous step e. was transmitted, and configuring the first optical sensor to acquire the reflection of said optical beam transmitted to said different location on the internal surface, in a plane perpendicular to said axis of rotational symmetry;
(i.) repeating steps e. to g.;
(j.) repeating steps h. and i. N times, where N is a whole number;
(k.) determining the internal diameter from a maximum value of said value of the circular internal geometrical parameter determined in step g. of each iteration;
said internal diameter being determined in a plane perpendicular to said axis of rotational symmetry.

6. A method for determining a plurality of diameters of a turbine engine component that has an axis of rotational symmetry and comprises:
an external side wall that is symmetrical about said axis of rotation and that delimits an open recess of said turbine engine component;
an internal side wall that is symmetrical about said axis of rotation, situated in said open recess, connected to said external side wall by a radial component and comprises an internal surface delimiting an open internal recess of the turbine engine component;
said plurality of diameters being determined in different planes perpendicular to said axis of rotational symmetry;

said method comprising the steps of claim 5 and also comprising the following steps:

(l.) configuring the first light source to transmit a beam to a location on the internal surface that is different from the location on which the light beam generated at the iteration of the previous step e. was transmitted, and configuring the first optical sensor to acquire the reflection of said optical beam transmitted to said different location on the internal surface, in a plane parallel to said axis of rotational symmetry;

(m.) executing steps a. to k. of the preceding claim 5;

(n.) repeating steps l. to m. M times, where M is a whole number;

(o.) supplying values for said plurality of internal diameters of the turbine engine component in said different planes perpendicular to said axis rotational of symmetry and corresponding to the different locations along said axis of rotational symmetry imposed in step l.

7. The method according to claim 6, wherein said turbine engine component is a stator stage of a turbine engine, in that said external side wall is an external collar, in that said internal side wall is an internal collar, and in that said radial component is a vane.

8. The method according to claim 6, wherein said support has a fixed position.

9. The method according to claim 6, wherein step c. comprises the following steps:

illuminating said external side wall using said first light source;

acquiring, by means of said first sensor, a calibration light signal coming from a reflection on the external side wall of the light beam generated in the previous step;

associating a position of said reference plane with an end of the calibration light signal of the previous step.

10. The method according to claim 5, wherein said turbine engine component is a stator stage of a turbine engine, in that said external side wall is an external collar, in that said internal side wall is an internal collar, and in that said radial component is a vane.

11. The method according to claim 5, wherein said support has a fixed position.

12. The method for determining a plurality of internal diameters of a turbine engine component according to claim 5, wherein:

the first light source is suitable for being activated and for illuminating said internal surface at different locations for the same position of the optical measurement device;

the first optical sensor is suitable for acquiring said light signals coming from the reflections of said light signals generated by the first light source, and in that;

step g. consists in converting said signals of step f. into a plurality of values of said internal diameter.

13. The method according to claim 5, wherein step c. comprises the following steps:

illuminating said external side wall using said first light source;

acquiring, by means of said first sensor, a calibration light signal coming from a reflection on the external side wall of the light beam generated in the previous step;

associating a position of said reference plane with an end of the calibration light signal of the previous step.

* * * * *